UNITED STATES PATENT OFFICE.

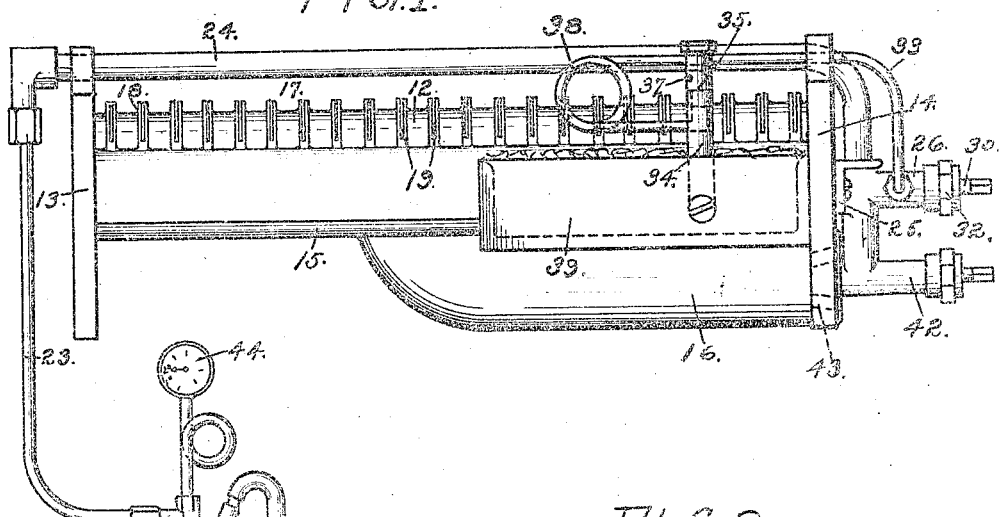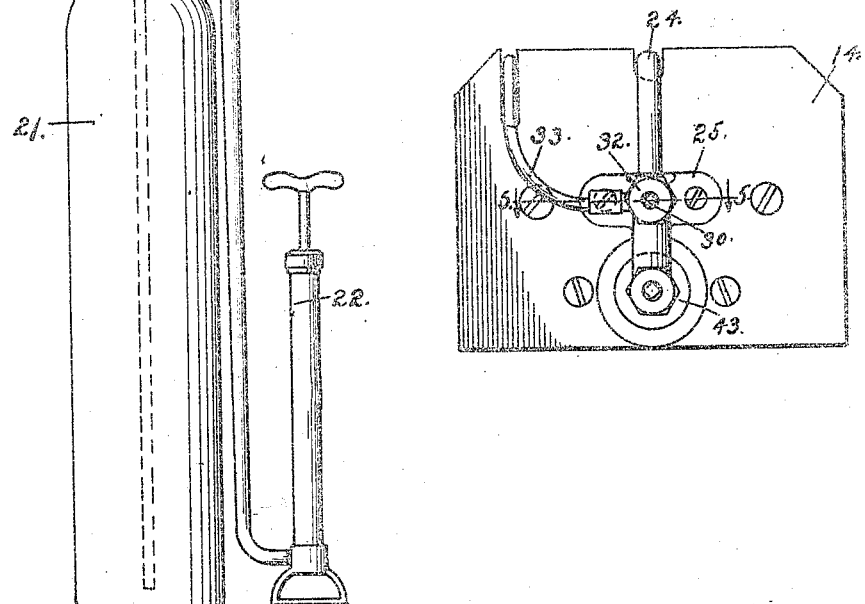

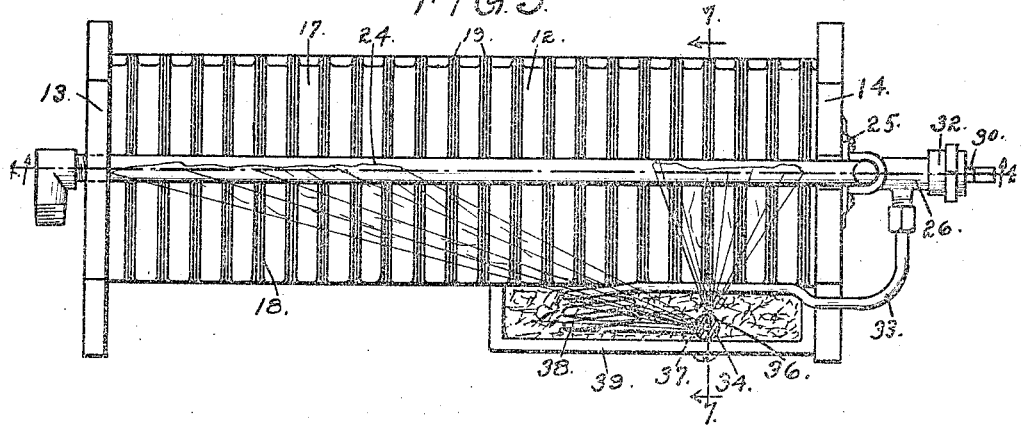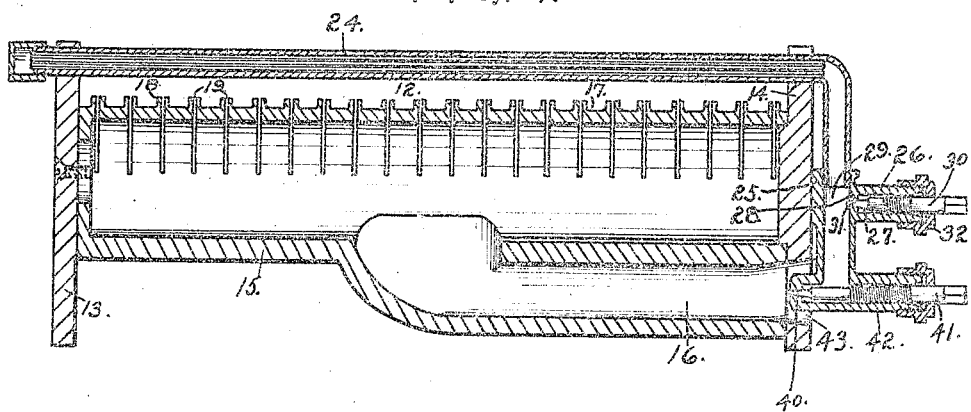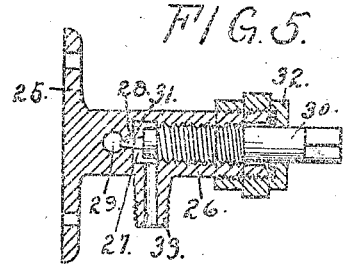

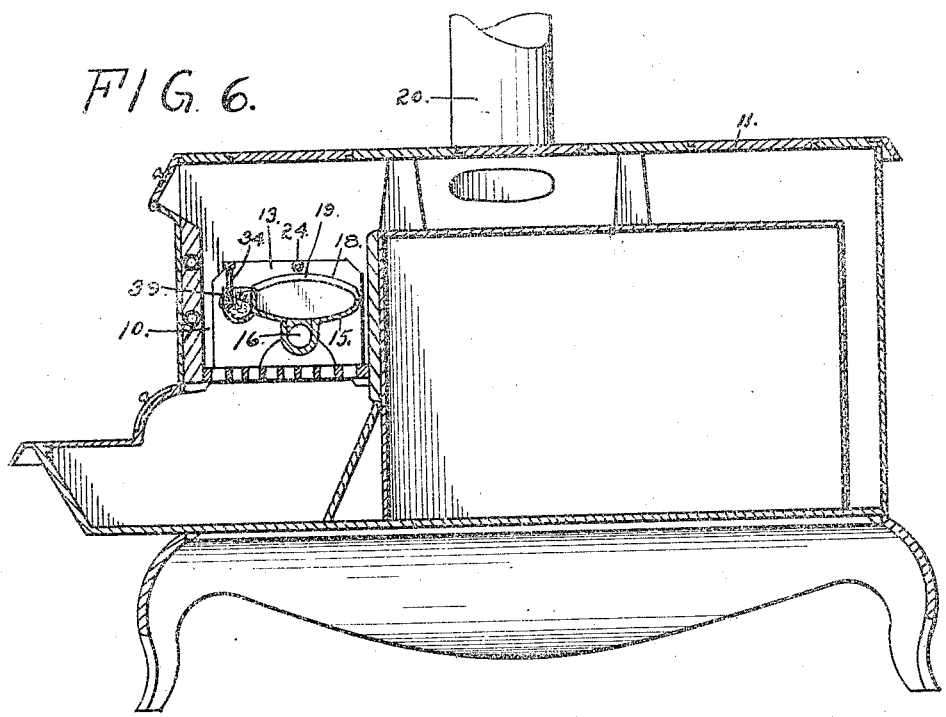
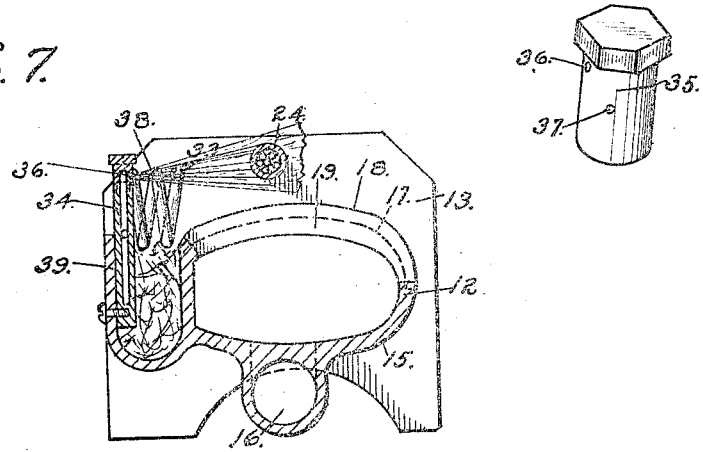

JOHN I. LOGAN, OF CHICAGO, ILLINOIS.

HEATING DEVICE FOR VAPORIZING AND BURNING KEROSENE.

1,230,735. Specification of Letters Patent. Patented June 19, 1917.

Application filed July 10, 1916. Serial No. 108,363.

*To all whom it may concern:*

Be it known that I, JOHN I. LOGAN, a citizen of the United States, residing at Chicago, in the county of Cook and State of Illinois, have invented certain new and useful Improvements in Heating Devices for Vaporizing and Burning Kerosene, of which the following is a specification.

My invention relates to heating devices for burning vaporized oils, and the principal object of the invention is to provide a device of this type suitable for burning kerosene. This is a desirable fuel on account of its cheapness but so far as I am aware, no satisfactory burner of the vaporizing type has been heretofore devised for utilizing kerosene in a heating device suitable for domestic purposes.

A further object of the invention is to provide a device for vaporizing kerosene which may be placed in a firebox of the ordinary range, or in other similar situations.

The invention has for further objects such other new and improved constructions, arrangements and devices in apparatus for burning vaporized oils as will be hereinafter described and claimed.

The invention is illustrated in a preferred embodiment in the accompanying drawings wherein—

Figure 1 is a side elevation of the burner showing also the oil supply tank and air pump.

Fig. 2 is an end elevation of the burner.

Fig. 3 is a plan view of the same.

Fig. 4 is a longitudinal sectional view on line 4—4 of Fig. 3.

Fig. 5 is a sectional plan on line 5—5 of Fig. 2.

Fig. 6 is a longitudinal view of a kitchen range of ordinary construction showing the burner of my invention arranged in the firebox.

Fig. 7 is a cross sectional view taken on line 7—7 of Fig. 3, and

Fig. 8 is a view, in perspective, on an enlarged scale, of the nozzle of the starting vaporizer.

Like characters of reference designate like parts in the several figures of the drawings.

The device, as shown in the drawings, is designed particularly to be placed in the fire-box 10 of an ordinary range 11 (Fig. 6). The burner 12 is a hollow body supported at opposite ends by metal plates 13, 14. The bottom 15 of the burner is preferably rounded from side to side and is formed with an intake duct 16 opening into the interior of the burner at about the center thereof. The top 17 of the burner is also rounded and is formed with a plurality of parallel transverse ribs 18 formed with burner slits 19. The ribs and slits preferably extend farther around the burner on one side than on the other, the top of the burner being rounded over more on this side than on the other, and in arranging the device in the stove this side is placed at the side of the fire-box adjacent the oven so that the flame is deflected backwardly over the oven and toward chimney 20 (Fig. 6).

The kerosene is kept in a tank 21 into which air is forced under pressure by means of a pump 22. 23 is a pipe leading from the kerosene tank to a vaporizing pipe 24 which extends longitudinally over the burner being supported on the end plates 13, 14. Pipe 24 is tapped into a double valve casing 25 which is secured to end plate 14. The casing 25 is formed with a boss 26 providing a valve chamber 27 communicating by port 28 with the main duct 29 of casing 25. Port 28 is controlled by a needle valve 30, the tapered part 31 of which is adapted to extend beyond the port 28 so that the closing of the valve will clean out any obstruction there may be in the port. The end of boss 26 is closed by a bonnet 32. A branch pipe 33 leads from valve chamber 27 to a nozzle 34 which is provided with a tip 35 formed with two perforations 36, 37, the branch pipe 33 being preferably coiled along side of the burner, as indicated at 38. 39 is a receptacle preferably cast integrally with the burner arranged below the starting vaporizer 33, 34, 38 and adapted to contain an absorbent material, such as asbestos, which is saturated with oil and the oil is ignited for the purpose of initially heating the starting vaporizer. The perforations 36, 37 in the tip 35 are disposed so that a jet is projected from perforation 36 against the vaporizing pipe 24 at the end near the valves, while another jet is projected from perforation 37 against the coil 38 and the remote end of vaporizing pipe 24.

The double valve casing 25 is formed with a vapor port 40 adapted to be controlled by a needle valve 41 threaded into a boss 42 formed on the valve casing 25. Vapor is delivered through port 40 into the duct 16 leading to the interior of the burner. Air enters the duct through the opening 43 in end plate 14. The kerosene tank 21 is preferably provided with a pressure gage 44.

Operation: To start the device a little kerosene is poured into receptacle 39 on the side of the burner and ignited. Valve 30 is opened. The flame beneath coil 38 is sufficient to vaporize the kerosene forced into the coil from tank 22 by the air pressure and two jets of flame are projected against the vaporizing pipe 24, as shown in Fig. 3, one of these flames striking against the coil so that the starting vaporizer is kept in operation even if the kerosene in receptacle 39 burns out. After the vaporizing pipe 24 has been heated sufficiently to generate enough vapor to start the burner valve 41 is opened and the kerosene vapor passes from pipe 24 into the duct 16 where it is mixed with air and passes into the interior of the burner. Once the burner is started it keeps vaporizing pipe 24 hot and the starting vaporizer may be closed off by shutting valve 30.

I have found that a burner of the form and construction shown will successfully vaporize and burn kerosene without any danger of explosions and back firing even when the flame is low. The combustion of the fuel is complete and a very considerable amount of heat may be generated by use of the device at low fuel cost. Enough air may be forced into the supply tank with one pumping to exhaust the entire contents thereof.

I claim:

1. A device for burning vaporized hydrocarbon comprising a hollow burner having an opening leading into the interior thereof for the admission of air and hydrocarbon vapor, the top of said burner being curved from side to side and provided with transverse raised ribs curved to conform with the curvature of the top of the burner and formed with burner slits.

2. A device for burning vaporized hydrocarbon comprising a hollow burner having a central opening in the bottom thereof for the admission of air and hydrocarbon vapor, the top of the burner being formed with raised ribs provided with burner slits; said ribs being spaced apart so as to provide air circulating channels between the burner slits.

3. A device for burning vaporized hydrocarbon comprising a hollow burner having its top and bottom rounded transversely from side to side, the bottom being provided centrally with an opening for the admission of air and hydrocarbon vapor, and the top with a plurality of transverse ribs formed with burner slits.

4. A device for burning vaporized hydrocarbon comprising a hollow burner having its top and bottom rounded transversely from side to side, the bottom being provided centrally with an opening for the admission of air and hydrocarbon vapor, and the top with a plurality of transverse ribs which extend farther over on one side of the burner than on the other and are formed from end to end with slits; said ribs being spaced apart so as to provide air circulating channels extending from side to side of said burner.

5. A device for burning vaporized hydrocarbon comprising a hollow burner having an opening leading into the interior thereof for the admission of air and hydrocarbon vapor, the top of said burner being curved from side to side and provided with transverse raised ribs which extend farther over on one side of the burner than on the other and are formed with slits extending from end to end.

6. In a hydrocarbon burning heating device, the combination of a hollow burner, a vaporizing pipe extending above and across said burner and arranged to deliver vapor into the interior of the burner, a branch pipe extending from said vaporizing pipe, coiled at one side of the burner and terminating in a nozzle adapted to project a jet of flame against the first named pipe, and a container for an absorbent material adapted to be saturated with oil arranged on the side of the burner below said coil and nozzle.

7. In a hydrocarbon burning heating device, the combination of a hollow burner provided with a duct in the bottom for the admission of air and vapor, the top being formed with a plurality of transversely arranged burner slits, a vaporizing pipe extending over the burner from end to end, a starting vaporizer arranged at one side of the burner communicating with the vaporizing pipe and terminating in a nozzle adapted to direct a jet of flame against said vaporizing pipe at a point above the burner, and means for heating said starting vaporizer.

8. In a device of the character described, the combination of a hollow burner formed in the top with transverse burner slits, supports for opposite ends of said burner, a vaporizer pipe extending above the burner from end to end, a starting vaporizer comprising a branch pipe and a nozzle adapted to project a flame against said first named pipe and a part of said branch pipe, a double valve casing on one of said end supports, valves for controlling the supply of fuel to the interior of the burner and to said starting vaporizer, and means for initially heating the starting vaporizer.

9. In a device of the character described, the combination of a hollow burner, the top of which is rounded transversely and is formed with transverse ribs provided with burner slits extending lengthwise thereof, supports for opposite ends of said burner, a vaporizing pipe extending above the burner from end to end, a starting vaporizer comprising a branch pipe coiled at one side of the burner, and a nozzle adapted to project a flame against said first named pipe and a flame against said coil, a double valve casing on one of said end supports, valves for controlling the supply of fuel to the interior of the burner and to said starting vaporizer, and a container on the side of the burner below said coil and nozzle for an absorbent material adapted to be saturated with oil for initially heating the starting vaporizer.

JOHN I. LOGAN.